US012646676B2

(12) United States Patent
Sovinec et al.

(10) Patent No.: US 12,646,676 B2
(45) Date of Patent: Jun. 2, 2026

(54) MULTI-METAL PATTERNED ANODE FOR COMPUTED TOMOGRAPHY X-RAY SYSTEMS

(71) Applicant: National Technology & Engineering Solutions of Sandia, LLC, Albuquerque, NM (US)

(72) Inventors: Courtney Leigh Hummell Sovinec, Albuquerque, NM (US); Edward Steven Jimenez, Jr., Albuquerque, NM (US); Noelle Melissa Collins, Albuquerque, NM (US); Gabriella Dalton, Albuquerque, NM (US); Kyle R. Thompson, Albuquerque, NM (US); Amber Lynn Dagel, Lafayette, CO (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 475 days.

(21) Appl. No.: 18/226,510

(22) Filed: Jul. 26, 2023

(65) Prior Publication Data

US 2024/0136143 A1 Apr. 25, 2024
US 2024/0234076 A9 Jul. 11, 2024

Related U.S. Application Data

(60) Provisional application No. 63/392,567, filed on Jul. 27, 2022.

(51) Int. Cl.
*H01J 35/08* (2006.01)

(52) U.S. Cl.
CPC ....... *H01J 35/116* (2019.05); *H01J 2235/081* (2013.01); *H01J 2235/086* (2013.01)

(58) Field of Classification Search
CPC ............... H01J 35/116; H01J 2235/081; H01J 2235/086
See application file for complete search history.

(56) References Cited

U.S. PATENT DOCUMENTS

2015/0110252 A1* 4/2015 Yun ....................... H01J 35/147 378/138
2017/0263412 A1* 9/2017 Maeda .................. H01J 35/186
2022/0230833 A1* 7/2022 Greenland ............ H01J 35/186

* cited by examiner

*Primary Examiner* — Chih-Cheng Kao
(74) *Attorney, Agent, or Firm* — Yee & Associates, P.C.; Gregory M. Doudnikoff; Mario A. Burgarello

(57) ABSTRACT

A multi-metal patterned anode for an X-ray detector is provided. The anode comprises a substrate and at least one group of disjointed circular features formed on the substrate, wherein the circular features are made from different metals. The circular features in different groups have different radii, and the circular features in the same group have the same radii. The groups of circular features are radially arrayed on the substrate. The substrate is made of diamond or beryllium.

22 Claims, 6 Drawing Sheets

MULTI-METAL PATTERNED ANODE FOR COMPUTED TOMOGRAPHY X-RAY SYSTEMS

CROSS REFERENCE TO RELATED APPLICATION

This application claims priority from provisional application No. 63/392,567, filed Jul. 27, 2022, entitled "MULTI-METAL PATTERNED X-RAY TRANSMISSION TARGET AND FABRICATION", assigned to the present assignee and incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to Computed Tomography (CT) X-ray systems, and more specifically to a multi-metal patterned anode for CT X-ray systems.

2. Description of the Related Art

Hyperspectral CT X-ray systems are used in identification and analysis of materials. Unlike conventional systems that measure the total intensity of X-rays, hyperspectral CT X-ray systems can discriminate between X-rays of different energies by using a photon counting detector, which bins detected X-ray photons by energy. This can be useful in applications such as material identification, where different materials being analyzed attenuate or absorb X-rays differently. By analyzing the resulting spectrum, hyperspectral CT X-ray systems can distinguish between different materials.

SUMMARY

An illustrative embodiment provides a multi-metal patterned anode for an X-ray detector. The anode comprises a substrate and at least one group of disjointed circular features formed on the substrate, wherein the circular features are made from different metals. The circular features in different groups have different radii, and the circular features in the same group have the same radii. In some example embodiments, each group comprises three circular features, wherein a first circular feature is composed of tungsten, a second circular feature is composed of samarium, and a third circular feature is composed of silver. The plurality of groups of circular features are radially arrayed on the substrate. The area of each group is equal to an area of a circle which encircles the circular features in the group. In some example embodiments, the area of the groups decrease with increasing radial distance from a center of the substrate, and in other example embodiments, the area of the groups increase with increasing radial distance from a center of the substrate. In some example embodiments, the substrate is made of diamond.

Another illustrative embodiment provides a multi-metal patterned anode for an X-ray detector. The anode comprises a diamond substrate and a plurality of groups each comprising three disjointed circular features formed on the diamond substrate. The plurality of groups are radially arrayed on the diamond substrate. Each circular feature is made from a different metal, wherein radii of the groups decrease with increasing radial distance from a center of the diamond substrate.

Another illustrative embodiment provides an X-ray system. The system comprises a cathode configured to emit electrons. The system comprises a multi-metal patterned anode configured to emit X-rays responsive to the electrons striking the anode. The patterned anode comprises a substrate and at least one group of disjointed circular features formed on the substrate, wherein each circular feature is made from a different metal. The system comprises a detector configured to detect the X-rays and generate corresponding electrical signals.

Another illustrative embodiment provides a method of fabricating a multi-metal patterned anode for an X-ray detector. The method comprises applying a layer of photoresist material on a substrate and aligning a photomask with the substrate, wherein the photomask comprises a transparent substrate with at least one group of disjointed circular opaque regions corresponding to desired mask patterns. The method comprises exposing the photoresist layer to ultraviolet (UV) light through the photomask using a photolithography process and developing the photoresist layer to remove either the exposed or unexposed areas of the photoresist. The method comprises depositing metal layers onto the mask patterns on the substrate using a deposition process to form at least one group of circular features on the substrate, wherein the circular features have different metal layers.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that conventional CT X-ray systems generally do not discriminate between X-rays of different energies by identifying energy distribution of the X-rays. As a consequence, conventional CT X-ray systems cannot discriminate well between materials with similar densities and have more beam hardening artifacts.

The illustrative embodiments provide a multi-metal patterned anode for improved spatial resolution of hyperspectral CT X-ray systems. The multi-metal patterned anode can also be used in conventional CT X-ray systems. The multi-metal patterned anode comprises one or more groups or clusters of metal features. The cluster of metal features has a smaller total surface area than the electron beam impinging upon it, thereby minimizing the focal spot of the systems and reducing geometric unsharpness of X-ray beams. In the present disclosure, the term "geometric unsharpness" refers to the loss of definition that is the result of geometric factors of X-ray systems. The factors controlling unsharpness are X-ray source size, source to object distance, and object to detector distance.

The illustrative embodiments provide a multi-metal patterned anode in which the metal features are composed of different metals. Each metal has a characteristic X-ray emission spectrum. When an electron beam is incident on the metal features composed of different metals, the X-rays emitted result in a combined emission spectrum that includes characteristic X-ray peaks of all the metals included in the group or cluster. By including multiple regions of high-intensity X-ray peaks across a wide range of peak energy values, signal-to-noise ratio (SNR) in the regions is improved.

Figure 1:
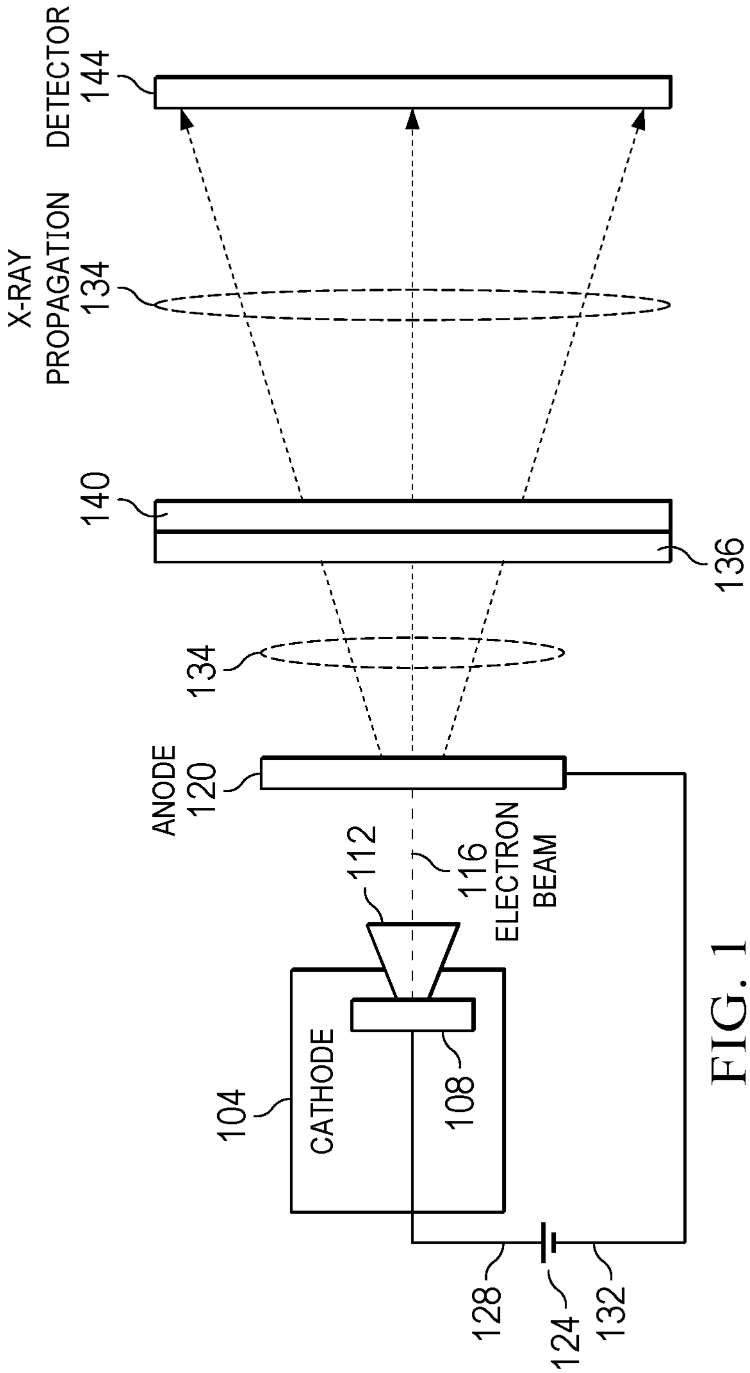
FIG. 1 depicts an X-ray system in accordance with an illustrative embodiment.

FIG. 1 depicts an X-ray system 100 in accordance with an illustrative embodiment. System 100 includes cathode 104 configured to emit electrons. Cathode 104 may include filament 108 which is a wire made of tungsten or another high-melting-point material. Cathode 104 may include focusing cup 112 configured to shape and direct the emitted electrons into a narrow electron beam 116. Focusing cup 112 prevents electron beam 116 from dispersing. Focusing cup 112 can be made of a metal, such as nickel.

System 100 includes a multi-metal patterned anode 120 which is placed directly in the line of electron beam 116. Multi-metal patterned anode 120 includes a substrate (not illustrated in FIG. 1). The substrate can be made of a material such as, for example, diamond or beryllium. The choice of substrate material depends on the specific requirements of System 100, including desired power output, heat dissipation, transparency to X-rays, and overall cost. Different substrate materials offer varying levels of thermal conductivity, mechanical strength, transparency to X-rays, and durability.

Multi-metal patterned anode 120 includes at least one group of disjointed or separated circular features (not illustrated in FIG. 1) formed on the substrate. In the present disclosure, the term "disjointed" means disconnected or not overlapping. The circular features may be composed of multiple dissimilar metals such as molybdenum, gold, silver, copper, samarium, or tungsten. The choice of the metals used in the circular features depends on specific applications, desired characteristic X-ray energies, and sensitivity and range of a detector. The disjointed circular features reduce the total effective surface area of an electron beam focal spot, thus minimizing the spread of X-rays produced by anode 120 which allows System 100 to achieve high spatial resolution. Multi-metal patterned anode 120 is illustrated in FIGS. 2, 3, 4 and 5A-5C—in more detail.

System 100 includes power supply 124 configured to apply a DC voltage between cathode 104 and anode 120. Power supply 124 includes first terminal 128 electrically coupled to cathode 104 and includes second terminal 132 electrically coupled to anode 120. Power supply 124, may for example, be a switch mode regulated converter which provides a regulated DC voltage. In some example embodiments, power supply 124 is configured to output a regulated DC voltage in a range of 0V to several hundred KV.

When a high voltage is applied between cathode 104 and anode 120, a strong electric field is established between cathode 104 and anode 120. As a result, an electric current flows through filament 108, causing it to heat up and emit electrons through a process called thermionic emission. The temperature of filament 108 may be controlled to ensure a consistent emission of electrons. Focusing cup 112 shapes and directs the emitted electrons into electron beam 116 pointed at anode 120. Electron beam 116 accelerates towards anode 120 and collides with anode 120. As a result, the electrons in the beam rapidly decelerate and transfer energy to the atoms of the anode material, resulting in the emission of X-rays 134. Since the substrate material of anode 120 is highly transparent to X-rays, a significant portion of X-rays 134 are created from the circular features of the anode, thus effectively shrinking the focal spot of X-rays 134.

System 100 may include collimator 136 which restricts beams in X-rays 134 to improve spatial coherence. Collimator 136 may include lead plates (not illustrated in FIG. 1) with an aperture through which X-rays 134 pass. Collimator 136 helps control the X-ray beams and reduces undesired radiation exposure by limiting the area being irradiated. System 100 may include filter 140 which is used to modify X-ray 134's spectral composition by selectively absorbing low-energy X-rays. Filter 140 may, for example, be made of aluminum or copper to minimize low-energy X-rays that are less useful for imaging, resulting in higher-energy X-rays that provide better image contrast.

System 100 includes X-ray detector 144 which converts X-rays 134 into an electrical signal or a digital image. In some example embodiments, X-ray detector 144 is an energy resolved photon counting detector that can detect X-ray spectrum.

In some example embodiments, X-ray detector 144 is implemented as a complementary metal-oxide-semiconductor (CMOS) detector. The CMOS detector includes an array of pixels, each consisting of a photodiode and a transistor (not illustrated in FIG. 1). As X-rays 134 interact with the photodiode, electrical charges are produced which are amplified and read out by the transistor. CMOS detectors offer high-speed readout, low noise, and high image quality.

In some example embodiments, X-ray detector 144 is implemented as a Cadmium Telluride (CdTe) photon counting detector. X-ray detector 144 may include an array of pixels, each consisting of a CdTe photodiode along with pulse processing electronics. As photons in X-rays interact with the photodiode, electrical charges are produced which are coupled to the pulse processing electronics, and in response the pulse processing electronics identify and bin the photons according to their energy.

Figure 2A:
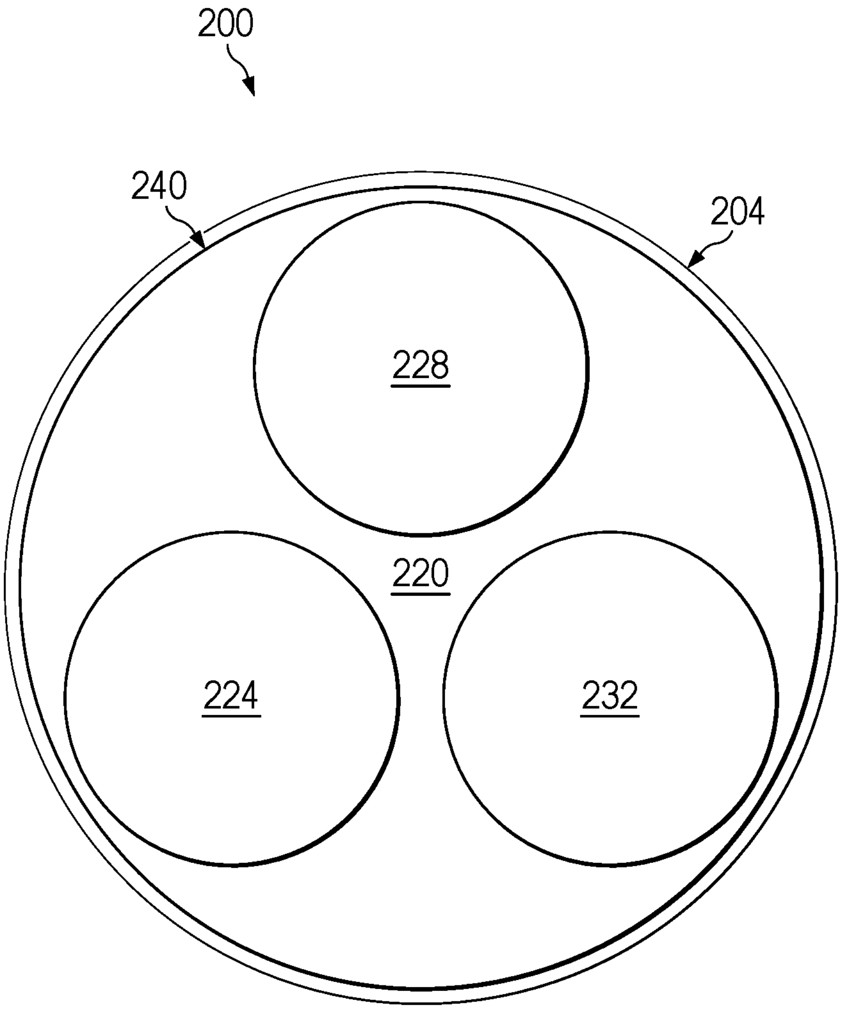
FIG. 2A depicts a top view of a multi-metal patterned anode in accordance with an illustrative embodiment.

FIG. 2A depicts a plan view of multi-metal patterned anode 200 in accordance with an illustrative embodiment. Multi-metal patterned anode 200 includes substrate 204 which can be made from a low-Z material with high-X-ray transmission and high thermal conductivity such as, for example, diamond or beryllium. Substrate 204 serves as a platform for metal features of anode 200. Substrate 204 also acts as a heat sink to dissipate heat generated in anode 200 during X-ray production. The material of substrate 204 is selected such that it can transfer and dissipate heat generated in anode 200 during X-ray production. Substrate 204 prevents overheating of anode 200 and ensures stable and continuous operation of anode 200. Substrate 204 can also absorb heat without undergoing significant expansion or contraction, thus reducing the risk of structural damage to anode 200. Substrate 204 also adds hardness and wear resistance to anode 200.

Anode 200 includes at least one group or cluster 220 of disjointed circular features 224, 228 and 232 formed on substrate 204. Although in the illustrative embodiment of FIG. 2A, group or cluster 220 includes three circular features, it will be appreciated that the number of circular features in a group or a cluster may vary. For example, a group or a cluster may comprise 1, 2, 4 or any number of circular features.

In some example embodiments, circular features 224, 228 and 232 are made from different metals. For example, circular features 224 may be composed of tungsten, circular features 228 may be composed of samarium, and circular features 232 may be composed of silver.

Although in the illustrative embodiment of FIG. 2A, features 224, 228 and 232 are depicted as having circular shapes, in other embodiments a cluster or a group may include features that are non-circular. For example, in some embodiments, features may be formed as having oval, octagonal or hexagonal-shaped.

In some example embodiments, features 224, 228 and 232 are clustered or placed in close proximity to each other while maintaining a gap between the features. For example, features 224, 228 and 232 may be clustered or placed in close proximity but separated by a 4 μm gap. In other example embodiments, features 224, 228 and 232 may be separated by a gap of less than 1 μm.

In some example embodiments, the area of group 220 is less than the area of an electron beam which is incident on group 220. In the present disclosure, the area of group 220 can be approximated to be equal to an area of the smallest circle which can encircle circular features 224, 228, and 232. In the illustrative embodiment of FIG. 2A, circle 240 is the smallest circle which can encircle circular features 224, 228 and 232. Thus, the area of circle 240 can be approximated as the area of group 220, and the area of circle 240 is less than the area of an electron beam incident on group 220.

When an electron beam strikes group 220, the area contributing to X-ray generation is mostly that of circular features 224, 228 232 rather than the total area struck by the beam. Also, different metals have characteristic X-ray emission spectra. As such, X-rays produced by circular features 224, 228 and 232, which are made of different metals, have different spectral characteristics. The spectrum of X-rays generated by anode 200 is the sum of the spectra from each feature in group 220. By including regions of high intensity X-ray peaks generated by circular features 224, 228 and 232 in the spectrum improves SNR in those regions, thus improving image quality.

In some example embodiments, features 220, 224 and 228 have a same width or diameter. For example, features 220, 224 and 228 each may have a width or diameter of 40 μm, 60 μm, 80 μm, or 100 μm. In some example embodiments, features 220, 224, and 228 may have dissimilar diameters or surface areas in order to vary load fractions of X-rays generated.

Figure 2B:
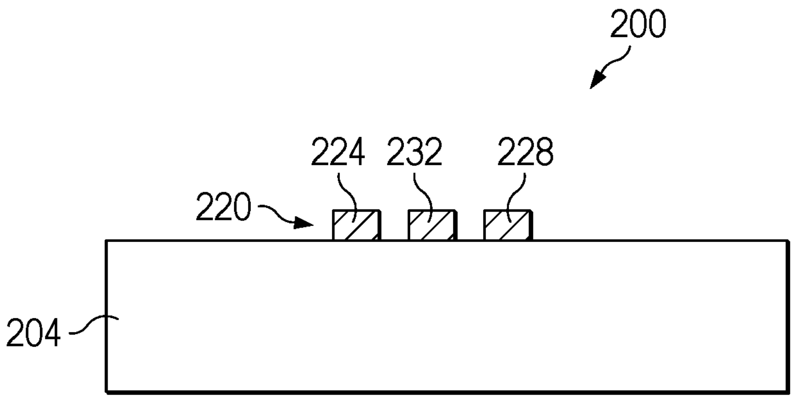
FIG. 2B depicts a cross-sectional view of a multi-metal patterned anode in accordance with an illustrative embodiment.

FIG. 2B depicts a simplified cross-sectional view of multi-metal patterned anode 200 in accordance with an illustrative embodiment. Anode 200 includes at least one group 220 of disjointed circular features 224, 228 and 232 formed on substrate 204 which provides mechanical support to anode 200. Substrate 204 is transparent to X-rays.

In the illustrative embodiment of FIG. 2B, although group 220 includes three circular features 224, 228 and 232, it will be appreciated that the number of circular features in a group or a cluster as well as the number of clusters in an anode may vary.

In some example embodiments, circular features 224, 228 and 232 are made from different metals. For example, circular feature 224 may be composed of tungsten, circular feature 228 may be composed of samarium, and circular feature 232 may be composed of silver. Circular features 224, 228 and 232 are clustered or placed in close proximity to each other while maintaining a gap between the features. For example, features 224, 228 and 232 may be clustered in close proximity but separated by a 4 μm gap. In other example embodiments, circular features 224, 228 and 232 may be separated by a gap of less than 1 μm. In some example embodiments, substrate 204 has a thickness of 300 μm, and features 224, 228 and 232 have a thickness of 2 μm.

Figure 3:
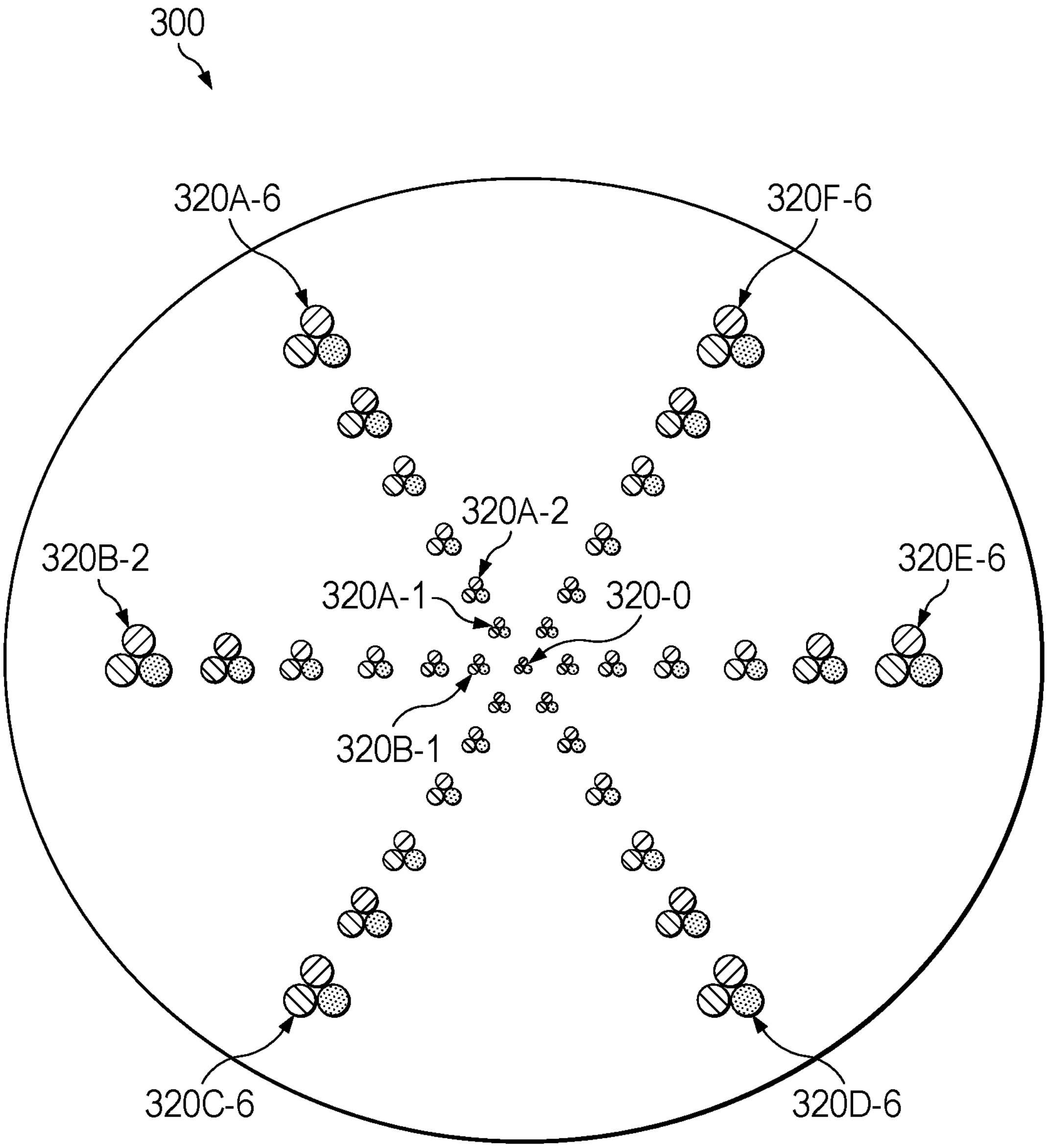
FIG. 3 depicts a top view of an example multi-metal patterned anode in accordance with an illustrative embodiment.

FIG. 3 depicts a top view of a multi-metal patterned anode 300 in accordance with an illustrative embodiment. Anode 300 includes a plurality of groups 320-0, 320A-1-320A-6, 320B-1-320B-6 . . . , and 320F-1-320E-6 (also referred to as clusters), with each group comprising three circular features. In the illustrative embodiment of FIG. 3, group 320-0 is located at the center of anode 300 while the remaining groups 320A-1-320A-6, 320B-1-320B-6 . . . , 320F-1-320E-6 are arranged radially around group 320-0. Within each group, the circular features are clustered in close proximity to each other while maintaining a gap between the features. For example, the three features in group 320A-6 are clustered in close proximity but separated by a gap of 4 μm.

In the illustrative embodiment of FIG. 3, the diameters of individual features in groups 320-0, 320A-1-320A-6, . . . , 320F-1-320E-6 increase with increasing radial distance from the center of anode 300. For example, the three features of group 320-0 have a 15 μm diameter, the three features of group 320A-1 have a 40 μm diameter, the three features of group 320A-2 have a 60 μm diameter, the three features of group 320A-3 have an 80 μm diameter, the three features of group 320A-4 have a 100 μm diameter, the three features of group 320A-5 have a 115 μm diameter, and the three features of group 320A-6 have a 135 μm diameter. The overall footprint of a group increases with increasing distance from the center of anode 300. Thus, group 320-0, which is located at the center of anode 300, has the smallest overall footprint, while group 320A-6 has the largest overall footprint along that radial axis of the 320A series of groups. The effect of this increasing diameter with increasing radial distance from the center is that anode 300 produces X-ray patterns where beams gradually are wider with increasing distance from the center of anode 300. Thus, beams generated by group 320-0 are the narrowest while beams generated by group 320A-6 are the widest.

In some example embodiments, groups 320-0, 320A-1-320A-6, . . . , and 320E-1-320E-6 are clustered close to the center of anode 300. The location of the clusters relative to the substrate can be dependent on a range of maneuverability of the electron beam in an X-ray tube. In some example embodiments, groups 320-0, 320A-1-320A-6, . . . , and 320F-1-320E-6 are displaced from one another sufficiently so that each group may accommodate an electron beam without the beam overlapping another group.

Figure 4:
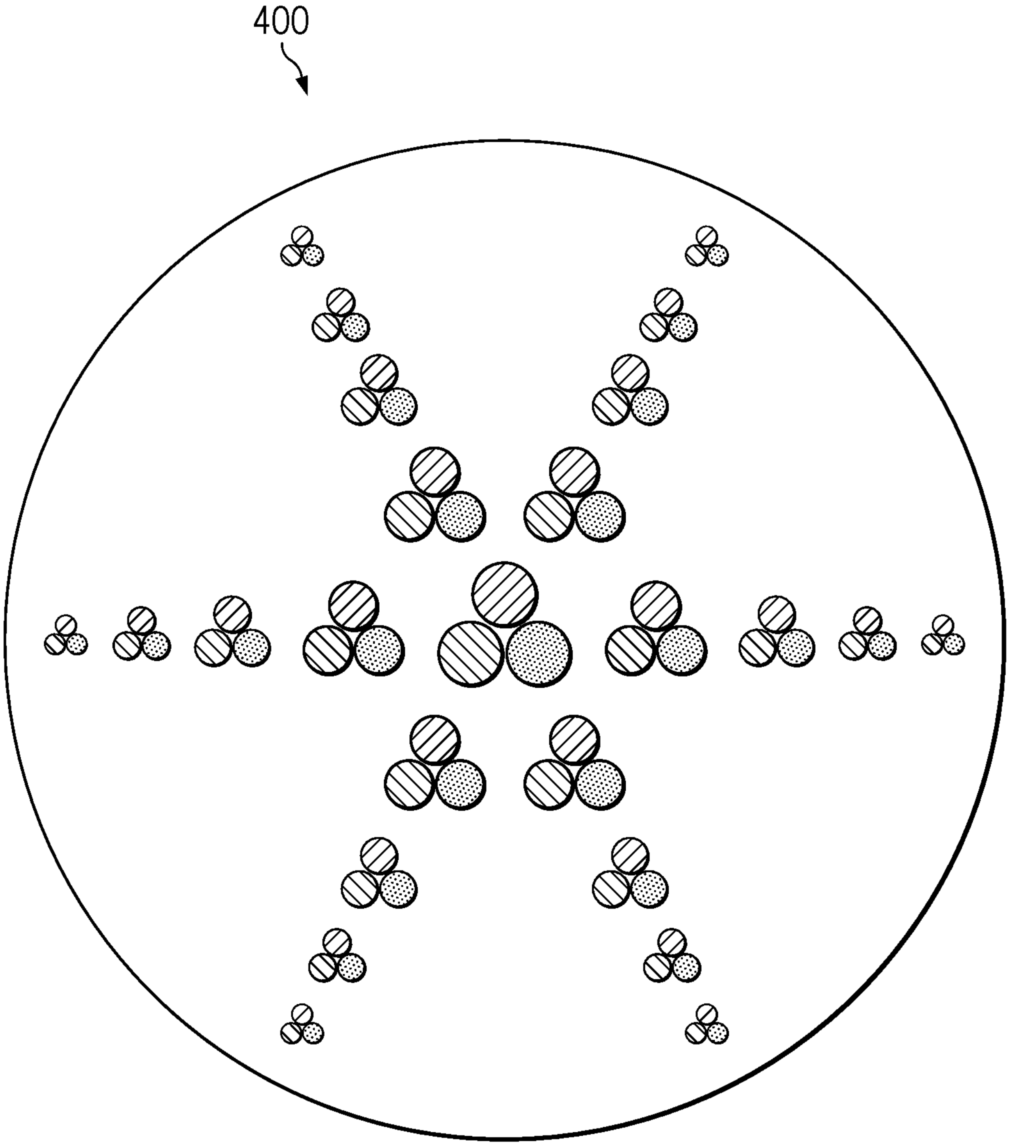
FIG. 4 depicts a top view of an example multi-metal patterned anode in accordance with an illustrative embodiment.

FIG. 4 depicts a top view of multi-metal patterned anode 400 in accordance with an illustrative embodiment. In FIG. 4, the groups are arranged in a pattern which is an inverse of the pattern depicted in FIG. 3. The diameters of individual circular features in the groups depicted in FIG. 4 decrease with increasing radial distance from the center of anode 400. Thus, the overall footprint of a group decreases with increasing distance from the center of anode 400. The effect of this decreasing diameter with increasing radial distance from the center is that anode 400 produces X-ray patterns that are an inverse of the X-ray patterns of anode 300. The beams produced by anode 400 become narrower with increasing radial distance from the center of anode 400.

Figure 5A:
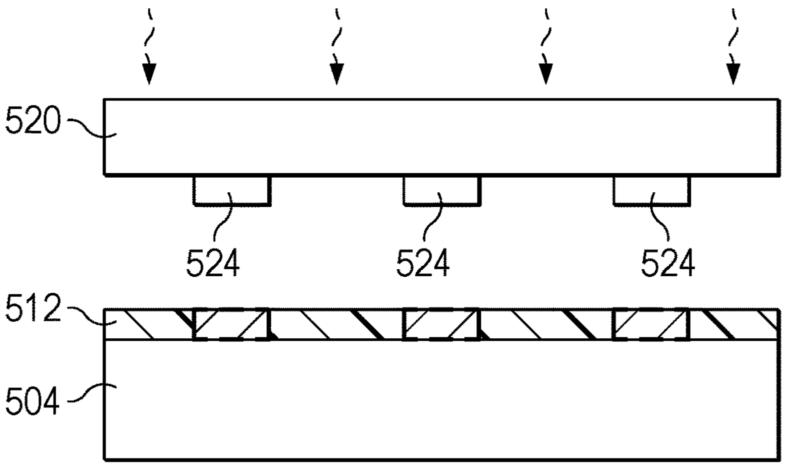
FIGS. 5A, 5B and 5C illustrate a portion of a process of fabricating a multi-metal patterned anode in accordance with an illustrative embodiment.
Figure 5B:
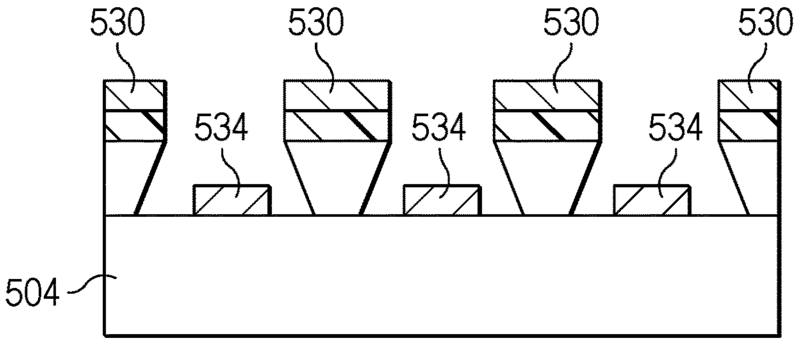
Figure 5C:
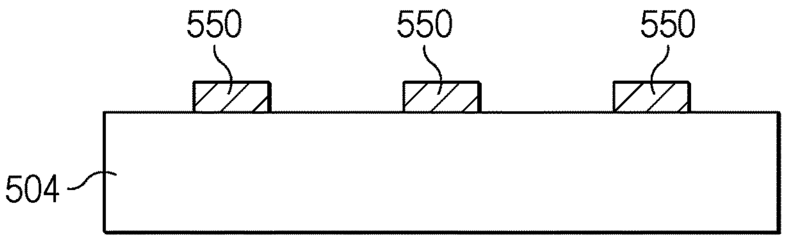

FIGS. 5A, 5B and 5C illustrate a process of fabricating a multi-metal patterned anode in accordance with an illustrative embodiment. Referring to FIG. 5A, substrate 504 is prepared. Substrate 504 can be composed of diamond, beryllium, silicon carbide, or other hard and low-Z materials with relatively high thermal conductivity. The choice of substrate material depends on the specific requirements, including a desired power output, heat dissipation, and overall cost.

Next, a thin layer of photoresist material 512 is applied to substrate 504. In some example embodiments, a technique called spin coating is used to apply photoresist material 512 on substrate 504. A desired amount of photoresist material 512 is dropped on substrate 504, and substrate 504 is spun at high speed, causing photoresist material 512 to spread evenly and form a uniform coating.

In some embodiments, a positive photoresist material may be applied and in some other embodiments a negative photoresist material may be applied. If a positive photoresist material is applied, exposure to light makes the photoresist material soluble in a developer solution. The exposed regions are removed, leaving behind a desired mask pattern on substrate 504. If a negative photoresist material is applied, exposure to light makes the photoresist material insoluble in a developer solution. The unexposed regions are washed away, leaving behind the desired mask pattern on substrate 504. In the example process illustrated in FIG. 5A, a negative photoresist material is applied.

A photomask 520 is used to selectively mask the applied photoresist from light. Photomask 520 may, for example, be a transparent glass plate with patterned opaque regions which mirror a desired pattern to be transferred onto substrate 504. In some example embodiments, the patterned opaque regions may be formed by one or more features 524.

Photomask 520 is aligned with substrate 504 and placed in close contact with photoresist material 512. The photoresist-coated substrate 504 and the aligned photomask 520 are exposed to ultraviolet (UV) light or other light of appropriate wavelengths. When the light passes through the transparent areas of photomask 520, the underlying photoresist material 512 is exposed. The exposed regions become insoluble, while the unexposed regions remain soluble.

FIG. 5B illustrates the removal of unexposed regions 534 of photoresist material 512. A developer solution is used to dissolve unexposed regions 534 of photoresist material, leaving behind desired mask patterns 530.

FIG. 5C illustrates metal layers 550 deposited on the mask patterns on substrate 504 to create circular features on substrate 504. Metal layers 550 may be deposited using chemical vapor deposition (CVD), physical vapor deposition (PVD), or plasma-enhanced chemical vapor deposition (PECVD). In some example embodiments, the circular features have different metal layers. The photoresist material underneath the deposited metal layer in masked regions is dissolved so that the metal in the masked regions is lifted away, leaving the metal in the unmasked regions.

Figure 6:
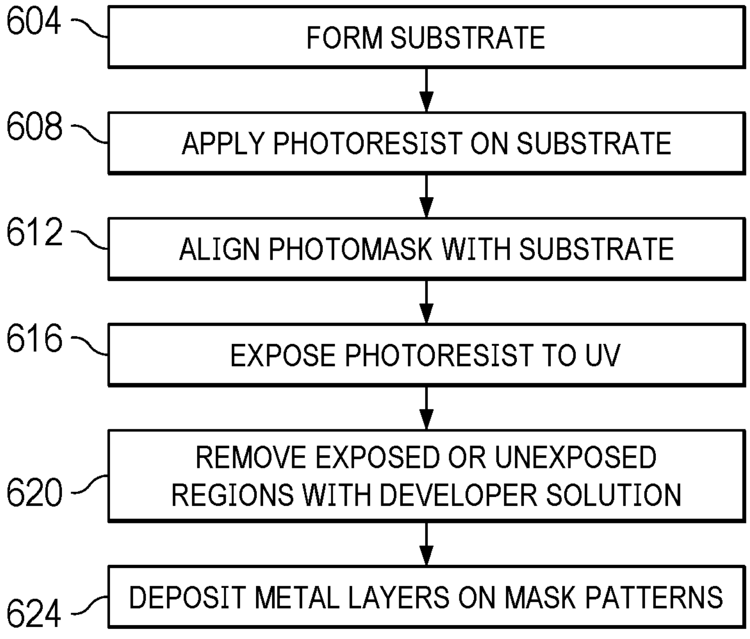
FIG. 6 depicts a flowchart illustrating a method of fabricating a multi-metal patterned anode in accordance with an illustrative embodiment.

FIG. 6 depicts a flowchart illustrating a method of fabricating a multi-metal patterned anode for an X-ray system in accordance with an illustrative embodiment. Process 600 starts with forming a substrate (step 604). The substrate may, for example, be formed of a layer of diamond. The choice of substrate material depends on the specific requirements, including a desired power output, heat dissipation, and overall cost.

A layer of photoresist material is then applied on the substrate (step 608). A technique called spin coating can be used to apply the photoresist material on the diamond. A photomask is aligned with the substrate (step 612). The photomask comprises a transparent substrate with at least one group of disjointed circular opaque regions corresponding to desired mask patterns. The photoresist layer is then exposed to ultraviolet (UV) light using a photolithography process (step 616). Depending on the type of photoresist layer used, a developer solution is used to remove either the exposed or unexposed areas of the photoresist layer (step 620).

Finally, metal layers are deposited on the mask patterns on the substrate using the deposition process to create at least one group of circular features on the substrate (step 624). In some example embodiments, the circular features have different metal layers. The process then ends.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A multi-metal patterned anode for an X-ray detector, that comprises:

a substrate; and a plurality of groups of three circular features radially aligned on the substrate, wherein the three circular features are each made from different metals from each other, and wherein radii of the three circular features decrease with increasing radial distance from a center of the substrate.

2. The multi-metal patterned anode of claim 1, wherein the three circular features in different groups have different radii.

3. The multi-metal patterned anode of claim 1, wherein the circular features in a same group have a same radii.

4. The multi-metal patterned anode of claim 1, wherein each group comprises three disjointed circular features.

5. The multi-metal patterned anode of claim 1, wherein each group comprises three circular features, and wherein a first circular feature is composed of tungsten, a second circular feature is composed of samarium, and a third circular feature is composed of silver.

6. The multi-metal patterned anode of claim 1, wherein a plurality of groups of circular features are radially arrayed on the substrate.

7. The multi-metal patterned anode of claim 1, wherein an area of each group is equal to an area of a circle which encircles the circular features in the group.

8. The multi-metal patterned anode of claim 7, wherein the area of the groups decrease with increasing radial distance from a center of the substrate.

9. The multi-metal patterned anode of claim 7, wherein the area of the groups increase with increasing radial distance from a center of the substrate.

10. The multi-metal patterned anode of claim 1, wherein the substrate is made of diamond.

11. A multi-metal patterned anode for an X-ray detector, wherein the multi-metal patterned anode comprises:

a substrate; and a plurality of groups each comprising three disjointed circular features formed on the substrate, the plurality of groups radially arrayed on the substrate, wherein each circular feature is made from a different metal, and wherein radii of the groups decrease with increasing radial distance from a center of the substrate.

12. The multi-metal patterned anode of claim 11, wherein the circular features of a same group have a same radii.

13. The multi-metal patterned anode of claim 11, wherein the circular features of different groups have different radii.

14. The multi-metal patterned anode of claim 11, wherein each group comprises three circular features, and wherein a first circular mask is composed of tungsten, a second circular mask is composed of samarium, and a third circular mask is composed of silver.

15. An X-ray system, that comprises:

a cathode configured to emit electrons;

a multi-metal patterned anode configured to emit X-rays responsive to the electrons striking the anode, the multi-metal patterned anode comprises:

a substrate;

a plurality of groups of three disjointed circular features radially aligned on the substrate, wherein each circular feature is made from a different metal from each other, and wherein radii of the three disjointed circular features decrease with increasing radial distance from a center of the substrate; and a detector configured to detect the X-rays and generate corresponding electrical signals.

16. The X-ray system of claim 15, wherein the circular features of different groups have different radii.

17. The X-ray system of claim 15, further comprising a second plurality of groups that each comprise disjointed circular features that each comprise a same radii as each other.

18. The X-ray system of claim 15, wherein each group comprises three circular features, and wherein a first circular feature is composed of tungsten, a second circular feature is composed of samarium, and a third circular feature is composed of silver.

19. A method of fabricating a multi-metal patterned anode for an X-ray detector, the method comprising:

applying a layer of photoresist material on a substrate;

aligning a photomask with the substrate, wherein the photomask comprises a transparent substrate with at least one group of disjointed circular opaque regions corresponding to desired mask patterns;

exposing the layer of photoresist material to ultraviolet (UV) light through the photomask using a photolithography process;

developing the layer of photoresist material to remove either the exposed or unexposed areas of the layer of photoresist material; and depositing metal layers onto the desired mask patterns on the substrate using a deposition process to form a plurality of groups that comprise three circular features radially aligned on the substrate, wherein the circular features have different metal layers from each other and wherein radii of the three circular features decrease with increasing radial distance from a center of the substrate.

20. The method of claim 19, wherein the circular features of different groups have different radii.

21. The method of claim 19, wherein each group comprises three circular features, and wherein a first circular feature is composed of tungsten, a second circular feature is composed of samarium, and a third circular feature is composed of silver.

22. A patterned anode for an X-ray detector, wherein the patterned anode comprises:

a substrate; and a plurality of groups radially aligned on the substrate, wherein each of the plurality of groups comprise three circular features, wherein each of the three circular comprises a different metal from each other, and wherein radii of the three circular features decrease with increasing radial distance from a center of the substrate.

* * * * *